US012667916B2

(12) United States Patent (10) Patent No.: US 12,667,916 B2
Vuille et al. (45) Date of Patent: Jun. 30, 2026

(54) METHOD FOR MANUFACTURING AN EXTERNAL COMPONENT INCLUDING A DIFFRACTION GRATING

(71) Applicant: Comadur SA, Le Locle (CH)

(72) Inventors: Pierry Vuille, Les Emibois (CH); Benoit Giry, Villers-le-lac (FR); Gabriel Rittiner, Le Locle (CH); Bastien Combotte, Grand'Combe Chateleu (FR)

(73) Assignee: Comadur SA, Le Locle (CH)

( * ) Notice: Subject to any disclaimer, the term of this patent is extended or adjusted under 35 U.S.C. 154(b) by 310 days.

(21) Appl. No.: 18/468,067

(22) Filed: Sep. 15, 2023

(65) Prior Publication Data

US 2024/0091882 A1 Mar. 21, 2024

(30) Foreign Application Priority Data

Sep. 16, 2022 (EP) ..................................... 22196175

(51) Int. Cl.
*B23K 26/362* (2014.01)
*G04B 45/00* (2006.01)
*B23K 101/34* (2006.01)
*G04B 19/06* (2006.01)

(52) U.S. Cl.
CPC ........ *B23K 26/362* (2013.01); *G04B 45/0015* (2013.01); *G04B 45/0076* (2013.01); *B23K 2101/34* (2018.08); *G04B 19/06* (2013.01)

(58) Field of Classification Search
CPC ...... B23K 26/362; G04B 19/06; G04B 19/12; G04B 37/22; G04B 45/0076
See application file for complete search history.

(56) References Cited

U.S. PATENT DOCUMENTS

| | | | |
|---|---|---|---|
| 4,604,329 A | 8/1986 | Reber | |
| 2002/0068148 A1 | 6/2002 | Nakamura et al. | |
| 2011/0018132 A1 | 1/2011 | Rey et al. | |
| 2017/0015584 A1 * | 1/2017 | Krzyzak | C03C 17/00 |
| 2017/0334236 A1 * | 11/2017 | Grossenbacher | B44C 1/14 |
| 2020/0009891 A1 * | 1/2020 | Nashner | B44C 3/005 |

(Continued)

FOREIGN PATENT DOCUMENTS

| | | |
|---|---|---|
| CH | 710 494 B1 | 11/2018 |
| CH | 715 906 A2 | 9/2020 |
| EP | 2 237 697 B1 | 11/2014 |

(Continued)

OTHER PUBLICATIONS

European Search Report issued Feb. 1, 2023 in European Application 22196175.8 filed on Sep. 16, 2022, 3 pages (with English Translation of Categories of Cited Documents).

(Continued)

*Primary Examiner* — Binh X Tran
(74) *Attorney, Agent, or Firm* — Oblon, McClelland, Maier & Neustadt, L.L.P.

(57) ABSTRACT

A method for manufacturing an external component of a watch, of a fashion item or of a jewellery item, wherein the external component includes depositing an opaque base layer on all or part of the surface of an inner face of a substrate made of a transparent material, localised ablation of the base layer by laser machining, so as to form at least one pocket the bottom of which has a diffraction grating.

8 Claims, 1 Drawing Sheet

(56)        References Cited

U.S. PATENT DOCUMENTS

2023/0251605 A1 *  8/2023  Lintymer ............. G04D 3/0092
                                                  368/232
2024/0099433 A1 *  3/2024  Vuille .................. A44C 27/007

FOREIGN PATENT DOCUMENTS

JP        2003240871  A  *  8/2003
JP        2005-254691 A     9/2005

OTHER PUBLICATIONS

Japanese Office Action issued Aug. 27, 2024 in Japanese Application 2023-122186, (with unedited computer-generated English translation), 10 pages.

* cited by examiner

METHOD FOR MANUFACTURING AN EXTERNAL COMPONENT INCLUDING A DIFFRACTION GRATING

CROSS-REFERENCE TO RELATED APPLICATION

This application claims priority to European Patent Application No. 22196175.8 filed on Sep. 16, 2022, the entire disclosure of which is hereby incorporated herein by reference.

TECHNICAL FIELD OF THE INVENTION

The invention falls within the field of horology, of fashion or jewellery items, and more particularly relates to a method for manufacturing an external component of a watch, of a fashion or jewellery item, said component including a diffraction grating.

In the present text, the notion "fashion item" comprises clothing accessories or items, such as belts, shoes, clothes, etc. and further comprises eyewear items, telephony items, or any other decorative object.

TECHNOLOGICAL BACKGROUND

In particular, in the field of horology, the external components for watches, particularly the dial, the flange, the bezel, etc., may have, for decorative purposes, decorations produced from thin layers deposited on the surface of a substrate. In particular, these thin layers make it possible to colour the external component, for example to print patterns on its surface.

The surface of an external component may also be structured, for example by machining, in order to have a certain relief.

Decorations on external parts may also be produced so as to generate diffraction phenomena of the light and thus have a colour that may vary according to the orientation of the direction of observation of a user and/or the orientation of a light source. These phenomena are generated by means of diffraction gratings produced on the external component, such as described in the document CH715906. This type of decoration is attractive insofar as it is evolutive and may be highly varied.

Nevertheless, the production of this type of decoration imposes a plurality of constraints particularly a high requirement in terms of controlling manufacturing tolerances and surface condition. Moreover, this type of decoration is only produced on metal materials. Therefore, there is a need to be able to produce decorations with diffraction gratings in a repeatable manner, by guaranteeing the respect of the manufacturing requirements, while diversifying the nature of the constituent material(s) of the external component.

SUMMARY OF THE INVENTION

To this end, the invention relates to a method for manufacturing an external component of a watch, of a fashion item or of a jewellery item, comprising the following steps of:

depositing an opaque base layer on all or part of the surface of an inner face of a substrate made of a transparent material,
  localised ablation of the base layer by laser machining, so as to form at least one pocket the bottom of which has a diffraction grating.

The performance of the ablation step on the base layer rather than on the substrate advantageously makes it possible to be able to produce the diffraction grating with a significantly reduced level of energy, due to the difference between their ablation thresholds.

In addition to authorising the selection of any transparent material to constitute the substrate, particularly a transparent material having a very high ablation threshold such as sapphire or glass, the method according to the invention makes it possible to guarantee an excellent repeatability and a control of the manufacturing tolerances due to the low levels of energy involved.

In particular implementations, the invention may further include one or more of the following features, taken alone or according to any technically possible combinations.

In particular implementations, the bottom of the pocket is formed by the substrate and/or by the base layer.

In particular implementations, a plurality of localised ablation steps are performed so as to produce a plurality of diffraction gratings.

In particular implementations, the method comprises a polishing step performed before the step of depositing the base layer, wherein the inner face of the substrate is polished.

In particular implementations, the method comprises an engraving step wherein all or part of the base layer is eliminated over its entire thickness without the inner face of the substrate being impacted.

In particular implementations, the method comprises a step of depositing a secondary layer wherein an opaque secondary layer is deposited at least on the diffraction grating.

In particular implementations, during the engraving step, a part of the secondary layer is eliminated so as to shape said layer according to a predefined shape, without the inner face of the substrate being impacted.

In particular implementations, an anti-reflection coating is deposited on an outer face of the substrate opposite the inner face.

According to another object, the present invention relates to a watch dial formed by implementing the method such as described above.

According to yet another object, the invention relates to a fashion item including an external component formed by implementing the method such as described above.

BRIEF DESCRIPTION OF THE FIGURES

Other features and advantages of the invention will become apparent upon reading the following detailed description given by way of a non-limiting example, and with reference to the accompanying drawings, wherein.

It should be noted that the figures are not to scale.

DETAILED DESCRIPTION OF THE INVENTION

The present invention relates to a method for manufacturing an external component 10 such as shown in FIGS. 2 to 5 in various examples of implementation of said method.

The external component 10 may advantageously be an external component of a watch, such as a dial, an external component of a fashion item, or of a jewellery item.

The terms "fashion items" define in the present text any external accessory or item, such as a belt, a shoe, clothing, etc., and further comprises eyewear items, telephony items, such as telephone casings, or any decorative object.

Figure 1:
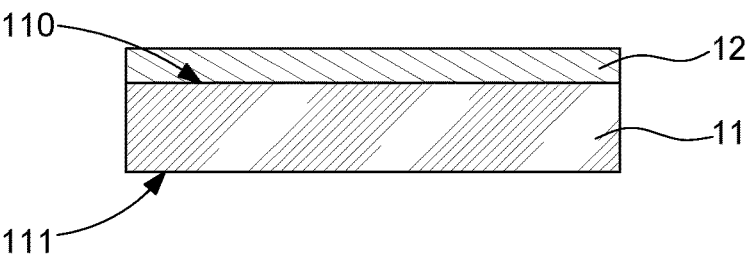
FIG. 1 schematically shows in sectional view, an external component being produced by implementing a step of a manufacturing method according to the invention.

The manufacturing method comprises a first step of depositing an opaque thin layer, referred to as "base layer" 12, on all or part of the surface of an inner face 110 of a substrate 11 made of a transparent material, as shown in FIG. 1. It should be noted that the term "transparent" designates in the present text a capacity of a material to allow all or part of a light ray, particularly light visible to the naked eye, to pass through. Such a transparent material may be sapphire, glass, etc.

The deposition of the base layer 12 may be performed by a physical vapour deposition, chemical vapour deposition method, or by any other appropriate method within the capabilities of the person skilled in the art. By way of example, the base layer 12 may be made of a metal material, particularly Cr, Au, Ti, Zr, of a dielectric material, alone or as an alloy, of oxide and/or nitride, for example of CrTiO2.

The inner face 110 of the substrate 11 is opposite an outer face 111 intended to be oriented towards an external environment, the inner face 110 being intended to be orientated towards an internal environment, for example facing a horological movement, in the case wherein the external component 10 is a component of a watch.

Preferably, the inner face 110 is polished during a preliminary polishing step, prior to depositing the base layer 12.

Figure 2:
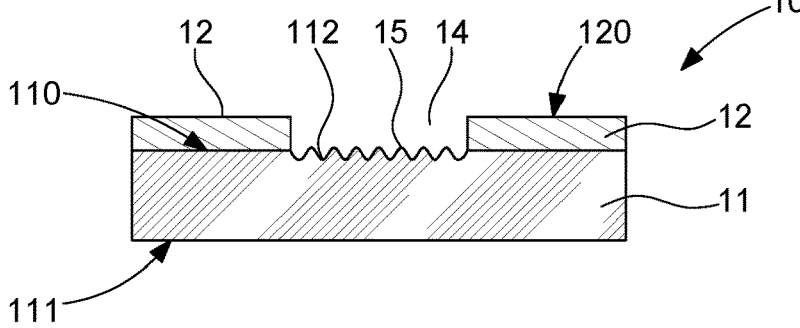
FIGS. 2 to 5 schematically show in sectional view, an external component obtained by implementing the manufacturing method according to the invention in various examples of implementation.

The method includes, following the step of depositing the base layer 12, a step of localised ablation of the base layer 12 by laser machining, so as to form, in the thickness of the base layer 12, a pocket or pockets 14 the bottom of which has a diffraction grating 15, such as shown in FIG. 2. The pocket 14 extends between an outer face 120 of the base layer 12 and the bottom, according to a direction materialising the thickness of the base layer 12.

In the present description of the invention and in concordance with the figures, reference is made below to only one pocket 14 and consequently to a single diffraction grating 15 to facilitate the reading of the text.

Such a diffraction grating 15 is formed by the periodic repetition of a diffracting pattern.

For example, the diffraction grating is formed by a plurality of parallel striations spaced apart from one another by a regular pitch, for example of a few micrometres, typically between 2 and 20 μm.

By way of example, the laser used for the laser machining may be a femtosecond laser, having a pulse energy of a few micro joules, for example between 1 and 5 μJ, and a repetition frequency of several hundreds of kilohertz, for example between 300 and 500 kHz.

In the example of embodiment shown in FIGS. 2 to 5, the pocket 14 opens onto the inner face 110 of the substrate 11, the diffraction grating being formed on said inner face 110. In other examples of embodiments of the invention, particularly depending on the parameters of the laser machining, such as the power or the energy of the laser, the position of the focal point, etc., and/or depending on the material constituting the base layer 12, the diffraction grating 15 may be formed by the inner face 110 of the substrate 11 or by a mixture of materials of the base layer 12 and of said substrate 11.

Advantageously, in order to enhance the decoration, the method according to the invention may include a plurality of localised ablation steps so as to generate a plurality of diffraction gratings 15 so as to show a particular pattern. These diffraction gratings 15 may be formed so as to be different from one another, for example, the orientation of their respective striations, the number and the dimensions of their striations or their separation pitches may be different. Furthermore, the diffraction gratings 15 may be generated on portions of the inner face 110 of the substrate 11 inclined in relation to one another.

In short, the ablation steps may be performed with different parameters depending on the desired appearance of the diffraction gratings to be produced, the determination of the values of these parameters being within the capabilities of the person skilled in the art.

As the localised ablation generates the pocket 14 and the diffraction grating 15 simultaneously, the diffraction grating 15 coincides perfectly with the pocket 14 with which it is generated. The respect of the alignment tolerances between the outer face 120 of the base layer 12 and the diffraction grating 15 is therefore guaranteed.

Figure 3:
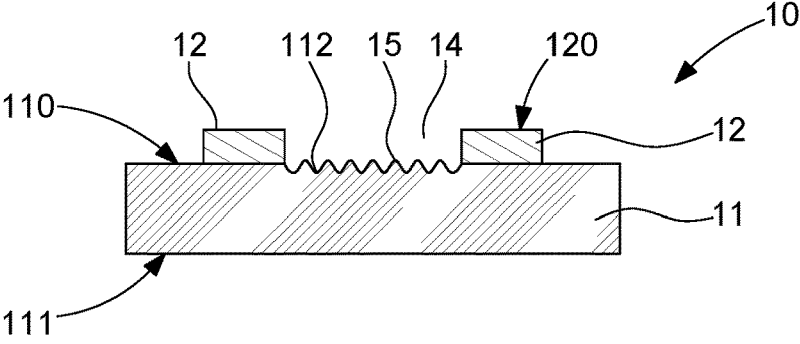

Advantageously, the method may comprise an engraving step wherein a part of the base layer 12 is eliminated over its entire thickness so as to shape said base layer 12 according to a predefined shape, without the inner face 110 of the substrate 11 being impacted, such as shown in FIG. 3. This feature helps to enhance the decorations that may be produced on the external component 10. Such an engraving step may be implemented by photolithography, laser machining, etc.

Alternatively, during the engraving step, the entire base layer 12 may be eliminated over its entire thickness.

In the examples of embodiments described above and shown in FIGS. 2 and 3, the user is intended to see the decoration of the external component 10 from the outer face 111, through said substrate 11, or from the inner face 110 according to the arrangement of said external component 10 within the watch, the jewellery or the fashion item.

When the user is intended to see the decoration of the external component 10 from the outer face 111, through said substrate 11, the latter advantageously has the effect of protecting the base layer 12 from potential hazards of the external environment.

In one example of implementation of the invention, the method may comprise a step of depositing a secondary layer 13, wherein an opaque secondary layer 13 is deposited on the diffraction grating 15 and on the base layer 12, if the latter is not completely eliminated during an engraving step or when no engraving step has been implemented. If an engraving step has been implemented and the entire base layer 12 has been eliminated, the secondary layer 13 is also deposited against the inner face 110 of the substrate 11, as shown in FIG. 4.

Figure 4:
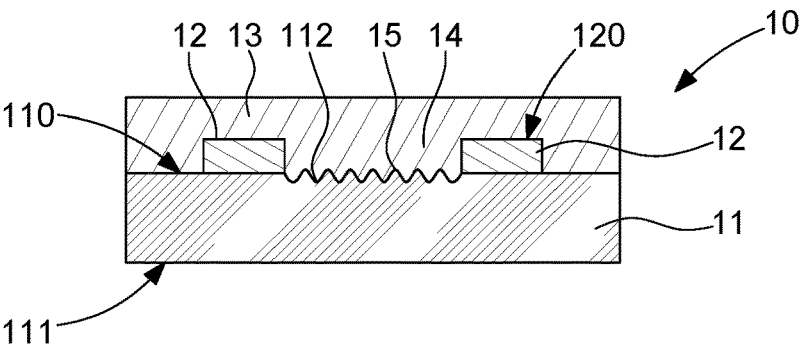
Figure 5:
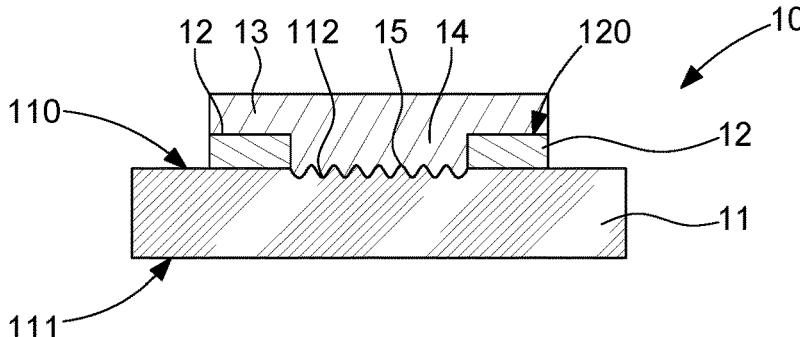

In this example of embodiment shown in FIGS. 4 and 5, the user is intended to see the decoration of the external component 10 only from the outer face 111 through said substrate 11.

The secondary layer 13 advantageously makes it possible to increase the reflection of the diffracted light rays, and thus increase the brightness and the contrast of the decoration generated. For this purpose, the layer may be made of metal material, ceramic, oxide and/or nitride.

In the example of implementation shown in FIG. 5, the engraving step may consist in concomitantly eliminating a part of the base layer 12 and a part of the secondary layer 13, so as to shape said layers according to a predefined shape, without the inner face 110 of the substrate 11 being impacted. The eliminated part of the secondary layer 13 is superimposed on that of the base layer 12.

Advantageously, an anti-reflection coating (not shown in the figures) may be deposited on the outer face 111 of the substrate 11. Such an anti-reflection coating makes it possible to favour the transmission of incident light rays and minimise, or even eliminate, the reflections of the incident light ray on the outer face 111 of the substrate 11. Thus, this feature makes it possible to intensify the appearance of the diffraction phenomenon.

An anti-reflection coating may also be deposited on the base layer 12 or on the secondary layer 13 depending on the example of implementation of the invention considered, and optionally on the inner face 110 of the substrate 11 if the engraving step has been performed.

It should be noted that, thanks to the features of the invention, the visual appearance of the decoration of the external component 10 may be particularly rich and attractive insofar as in addition to the colours that can be envisaged for the base layer 12 and optionally of the secondary layer 13, the appearance of the diffraction grating 15 is added. Moreover, the method according to the invention makes it possible to generate a visual effect of depth between the base 12 and secondary layers 13 and the diffraction grating 15.

Moreover, the base layer 12 advantageously makes it possible to be able to produce, on a transparent substrate 11, a decoration with a diffraction grating 15 by a laser machining requiring a low power, which makes it possible to guarantee a better control of the repeatability of the machining, and consequently, to ensure a constant respect of the manufacturing tolerances. Moreover, the performance of a machining requiring a high power would cause an alteration of the surface condition of the inner face 110 of the substrate 11 leading to a matification of its surface, in addition to the uncertainties generated as regards the respect of the dimensional requirements of the external component 10.

More generally, it should be noted that the implementations and embodiments considered above have been described by way of non-limiting examples, and that other alternatives are consequently possible.

In particular, the base layer 12 and/or the secondary layer 13 may consist of a stack of thin layers, in a manner known per se by the person skilled in the art.

The invention claimed is:

1. A method for manufacturing an external component of a watch, of a fashion item or of a jewellery item, wherein the method comprises the following steps of:
   depositing an opaque base layer on all or part of the surface of an inner face of a substrate made of a transparent material; and
   localised ablation of the opaque base layer by laser machining, so as to form at least one pocket the bottom of which has a diffraction grating,
   wherein the bottom of the pocket is formed by the substrate and by the opaque base layer,
   wherein a plurality of localized ablation steps are performed so as to produce a plurality of diffraction gratings, and
   wherein the plurality of diffraction gratings are formed of a mixture of materials of the opaque base layer and the substrate.

2. The method according to claim 1, comprising a polishing step performed before the step of depositing the opaque base layer, wherein the inner face of the substrate is polished.

3. The method according to claim 1, comprising a step of depositing a secondary layer wherein an opaque secondary layer is deposited at least on the diffraction grating.

4. The method according to claim 1, wherein an anti-reflection coating is deposited on an outer face of the substrate opposite the inner face.

5. The method according to claim 1, comprising an engraving step wherein all or part of the opaque base layer is eliminated over its entire thickness without the inner face of the substrate being impacted.

6. The method according to claim 5, comprising a step of depositing a secondary layer wherein an opaque secondary layer is deposited at least on the diffraction grating, and wherein, during the engraving step, a part of the secondary layer is eliminated so as to shape said layer according to a predefined shape, without the inner face of the substrate being impacted.

7. A watch dial formed by implementing the method according to claim 1.

8. A fashion item comprising an external component formed by implementing the method according to claim 1.

* * * * *